United States Patent
Kitagawa et al.

(10) Patent No.: US 6,931,191 B2
(45) Date of Patent: Aug. 16, 2005

(54) PHOTONIC CRYSTAL DEVICE HAVING VARIABLE BANDGAP, OPTICAL WAVEGUIDE USING THE SAME, AND OPTICAL MULTIPLEXING/ DEMULTIPLEXING DEVICE USING THE SAME

(75) Inventors: Hitoshi Kitagawa, Miyagi-ken (JP); Naoki Ito, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 267 days.

(21) Appl. No.: 10/327,358

(22) Filed: Dec. 20, 2002

(65) Prior Publication Data

US 2003/0128949 A1 Jul. 10, 2003

(30) Foreign Application Priority Data

Jan. 8, 2002 (JP) ........................ 2002-001840

(51) Int. Cl.⁷ ............................ G02B 6/10; G02B 6/28; G02B 6/35; G02B 6/34
(52) U.S. Cl. ................................ 385/129; 16/24; 16/37
(58) Field of Search ..................... 385/4, 8–10, 16–24, 385/37, 39, 40, 129

(56) References Cited

U.S. PATENT DOCUMENTS

| | | | |
|---|---|---|---|
| 5,688,318 A | 11/1997 | Milstein et al. | |
| 5,739,796 A | 4/1998 | Jasper, Jr. et al. | |
| 5,973,823 A | * 10/1999 | Koops et al. | 359/322 |
| 6,064,506 A | * 5/2000 | Koops | 359/237 |
| 6,175,671 B1 | * 1/2001 | Roberts | 385/14 |
| 6,778,722 B1 | * 8/2004 | Klocek et al. | 385/16 |
| 2001/0026659 A1 | * 10/2001 | Sekine et al. | 385/40 |
| 2004/0091224 A1 | * 5/2004 | Baumberg et al. | 385/129 |

FOREIGN PATENT DOCUMENTS

| | | |
|---|---|---|
| EP | 0546797 A1 | 6/1993 |
| EP | 0572182 A1 | 12/1993 |
| GB | 2374678 A | 10/2002 |
| WO | WO 98/26316 | 6/1998 |

OTHER PUBLICATIONS

Leonard, S. W. et al.: "Tunable Two–Dimensional Photonic Crystals Using Liquid–Crystal Infiltration" Phys. Rev. B, Condens. Matter (USA), Physical Review B (Condensed Matter), Jan. 15, 2000, APS, Through AIP, USA, vol. 61, No. 4, Jan. 15, 2000, pp. R2389–R2392, XP002290348, ISSN: 0163–1829 *the whole document*.

* cited by examiner

Primary Examiner—Michelle R. Connelly-Cushwa
(74) Attorney, Agent, or Firm—Beyer Weaver & Thomas LLP

(57) ABSTRACT

A photonic crystal device having a variable bandgap includes a periodic structural body including a plurality of separate dielectric members arranged at intervals. The dielectric members are formed of a high-dielectric material. A variable-dielectric-constant material whose dielectric constant is varied by an electric field is filled in the spaces between the dielectric members. Electrodes are also provided for applying an electric field to the variable-dielectric-constant material.

3 Claims, 12 Drawing Sheets

PHOTONIC CRYSTAL DEVICE HAVING VARIABLE BANDGAP, OPTICAL WAVEGUIDE USING THE SAME, AND OPTICAL MULTIPLEXING/ DEMULTIPLEXING DEVICE USING THE SAME

BACKGROUND OF THE INVENTION

1. Field of the Invention

The present invention relates to a photonic crystal device for controlling optical transmission and reflection by varying the dielectric constant on the basis of the presence or absence of an electric field, and to an optical waveguide and an optical multiplexing/demultiplexing circuit including the photonic crystal device.

2. Description of the Related Art

Materials having a periodic refractive index structure with a period substantially equal to an optical wavelength are known as photonic crystals. Photonic crystals have a photonic bandgap, in which light having a wavelength corresponding to the period of the structure cannot be present, consequently preventing the presence and transmission of light having a specific wavelength. It is therefore considered that the photonic crystals have a possibility of easily controlling light transmission. Such a photonic crystal has been of interest and thought of for a next-generation electronic and optoelectronic material.

The theory of this new concept, the photonic crystal, was introduced for the first time in 1987 by S. John and E. Yablonovitch, and various methods for producing photonic crystals have been researched.

In order to form a three-dimensional periodic structure, micromachining and deposition techniques for, originally, manufacturing semiconductor elements and devices have been studied. In such techniques, particles having a size substantially equal to an optical wavelength, being used as a structural unit of the photonic crystal, are piled in two or three dimensions. For example, a photonic crystal formed by piling $SiO_2$ spherical particles of several hundred nanometers in size is known. Such a crystal having a periodic structure is also referred to as an artificial opal because it exhibits extremely beautiful iridescence of showing subtly different colors depending on angle.

SUMMARY OF THE INVENTION

The inventors of the present invention have been conducted research on the photonic crystals. The present invention is based on the findings in the research, and a completely new type of photonic crystal device has been achieved by applying some technique found by the inventors to a photonic crystal having a two or three dimensional periodic structure.

Specifically, the inventors found that, in a combination of a two or three dimensional periodic structure and a material whose dielectric constant is varied by an electric field, the wavelength band of a photonic bandgap shifts on the basis of the presence or absence of an electric field. The present invention was completed based on this finding.

Accordingly, an object of the present invention is to provide a photonic crystal device for switching between transmission and interruption of light having a specific wavelength by controlling the wavelength band of a photonic bandgap thereof, and to provide an optical waveguide and an optical multiplexing/demultiplexing device including the photonic crystal device.

According to an aspect of the present invention, a photonic crystal device having a variable bandgap is provided. The photonic crystal device comprises a periodic structural body including a plurality of separate dielectric members arranged at intervals. The dielectric members are formed of a high-dielectric material. The photonic crystal device also includes a variable-dielectric-constant material whose dielectric constant is varied by an electric field. The variable-dielectric-constant material is filled in the spaces between the dielectric members. Electrodes also are disposed for applying an electric field to the variable-dielectric-constant material. Thus two or three dimensional periodic structure is formed which has the plurality of dielectric members and the variable-dielectric-constant material between the dielectric members. By selecting whether or not an electric field is applied to the variable-dielectric-constant material from the electrodes, the dielectric constant of the variable-dielectric-constant material is varied, and accordingly the wavelength band of a photonic band gap can be shifted. By using light having a wavelength corresponding to a wavelength band in which the light is not present due to the photonic bandgap, transmission characteristics for the light can be easily controlled.

Specifically, by varying the dielectric constant of the variable-dielectric-constant material on the basis of the selection whether or not a voltage is applied to the electrodes, the wavelength band of a photonic bandgap is shifted and, thus, the transmission characteristics for light having a specific wavelength can be controlled.

According to another aspect of the present invention, a photonic crystal device having a variable bandgap is provided. The photonic crystal device comprises a main body formed of a high-dielectric material. The main body has a plurality of separate holes arranged at intervals, thereby forming a periodic structural body. A variable-dielectric-constant material whose dielectric constant is varied by an electric field is held in the holes. The photonic crystal device also has electrodes for applying an electric field to the variable-dielectric-constant material.

Thus two or three dimensional periodic structure is formed which has the plurality of dielectric members and the variable-dielectric-constant material between the dielectric members. By selecting whether or not an electric field is applied to the variable-dielectric-constant material from the electrodes, the dielectric constant of the variable-dielectric-constant material is varied, and thus the wavelength band of a photonic bandgap can be shifted. By using light having a wavelength corresponding to a wavelength band in which the presence of the light is prevented according to the shift of a photonic bandgap, transmission characteristics for the light can be easily controlled.

Specifically, by varying the dielectric constant of the variable-dielectric-constant material on the basis of the selection whether or not a voltage is applied to the electrodes, the wavelength band of a photonic bandgap is shifted and, thus, the transmission characteristics for light having a specific wavelength can be controlled.

The dielectric members or the main body may be formed of a material selected from the group consisting of Si, GaP, GaAs, InP, and ZnTe.

Since-these materials have a high dielectric constant, and are easily made conductive by ion doping, the dielectric members can double as electrodes, thus forming a structure helping apply an electric field to the variable-dielectric-constant material. Thus, the shift of a photonic band gap is ensured and optical transmission characteristics can be controlled.

Preferably, the variable-dielectric-constant material is a liquid crystal.

By selecting whether or not an electric field is applied to the liquid crystal, a photonic band gap can be shifted, and accordingly, light transmission characteristics can be controlled. The liquid crystal can increase light transmission efficiency because of the excellent transmittancy thereof. In addition, the dielectric constant of the liquid crystal can be varied on the basis of the presence or absence of an electric field. Thus, the liquid crystal facilitates a clear shift of photonic band gaps.

Preferably, the dielectric members or the holes are arranged with a period corresponding to a specific optical wavelength.

Thus, a periodic structure for controlling light transmission characteristics can be achieved. It is preferable that the period correspond to an optical wavelength. However, the period is not needed to be equivalent to the optical wavelength and may be several times larger than the optical wavelength.

Preferably, whether or not the periodic structural body transmits light having a specific wavelength is selected on the basis of the bandgap formed according to the dielectric constant of the dielectric members or the main body and changes in the dielectric constant of the variable-dielectric-constant material. The changes result from the presence or absence of an electric field.

Thus, an optical shutter for switching between light transmission and interruption is provided.

According to another aspect of the present invention, an optical waveguide device comprising any one of the above-described photonic crystal devices is provided.

Preferably, at least some of the dielectric members or holes arranged in the periodic structural body are eliminated. The region where the dielectric members are eliminated defines an optical waveguide.

By eliminating some of the dielectric members or holes, a defect is introduced to the photonic crystal. The defect region draws the ends of a photonic bandgap into the photonic bandgap to cause localization at the vicinity of the ends of the photonic bandgap, so that light is trapped in the localization. Consequently, the light is guided along the defect region and, thus, the defect region where the dielectric members are eliminated can serve as an optical waveguide. Thus, whether light is transmitted or not is determined on the basis of the presence or absence of an electric field and the light can be guided so as to travel along the optical waveguide.

According to another aspect of the present invention, an optical multiplexing/demultiplexing device comprising any one of the above-described photonic crystal device is provided. Thus, the optical multiplexing/demultiplexing device has characteristic features the photonic crystal device has.

According to another aspect of the present invention, an optical waveguide device is provided which comprises a pair of substrates opposing each other and a sealant for joining the substrates at the edges of the substrates. At least part of the sealant is light-transmissive. The optical waveguide device also includes a liquid crystal sealed in the region surrounded by the substrates and the sealant. Division walls for partitioning the region are disposed between the substrates to define a plurality of conversion regions. At least part of each of the division walls is light-transmissive. Electrodes are also provided at positions on the substrates corresponding to the conversion regions. A plurality of cylindrical rods are arranged in each conversion region at a period corresponding to an optical wavelength. The dielectric constant of the liquid crystal in each conversion region is arbitrarily varied by applying an electric field to the corresponding conversion region.

By applying an electric field to the liquid crystal in desired conversion regions from electrodes, the wavelength band of the photonic bandgap formed in the desired conversion regions of the periodic structural body can be arbitrarily shifted. Thus light can be transmitted through the desired conversion regions in a desired direction. Thus, an optical waveguide device can be achieved which is capable of guiding light in a desired direction.

Preferably, at least part of the sealant has a light inlet and a light outlet.

Thus, light is introduced to the periodic structural body of desired conversion regions through the light inlet. By applying an electric field, one after another, to the liquid crystal in a conversion region where the light is introduced and subsequently the adjacent conversion region, a waveguide can be formed corresponding to the conversion regions where the electric field is applied.

Preferably, the division walls are formed of a light-transmissive material, and the electrodes corresponding to desired conversion regions apply an electric field to the desired conversion regions, thereby guiding light through the desired conversion regions.

Thus, the waveguide device can transmit light in any direction along the substrate.

DESCRIPTION OF THE PREFERRED EMBODIMENTS

Figure 1:
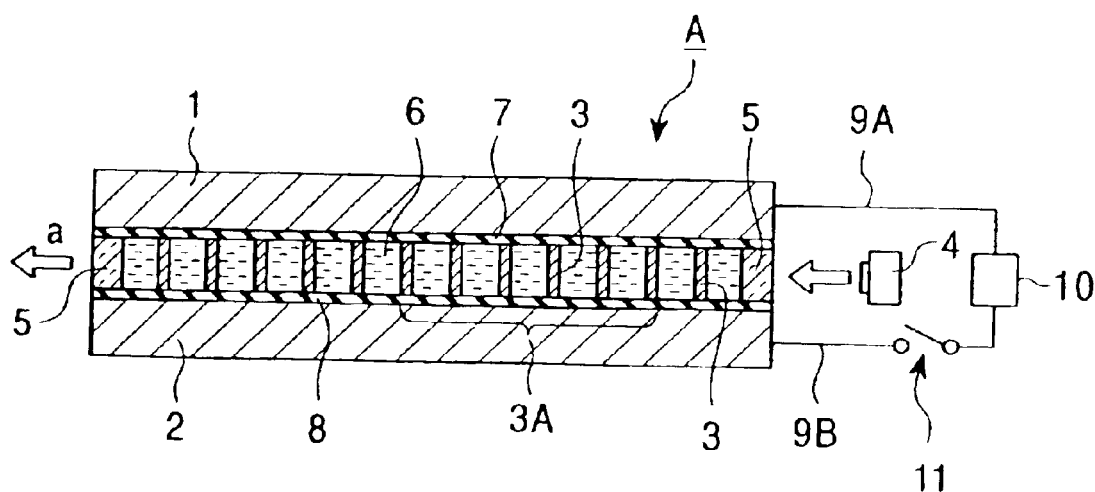
FIG. 1 is a sectional view of a photonic crystal device according to a first embodiment of the present invention.

Embodiments of the present invention will now be described with reference to the drawings. The scope of the present invention is not limited to the embodiments, and scales of parts in the drawings are varied from one component part to another for ease of representation. FIG. 1 shows a photonic crystal device according to a first embodiment of the present invention. The photonic crystal device A comprises two conductive substrates 1 and 2 separately disposed substantially in parallel with each other, a transparent sealant 5 surrounding the space between the substrates 1 and 2, a plurality of cylindrical rods (dielectric members) 3 arranged between the substrates 1 and 2 with a period substantially equal to an optical wavelength, and a liquid crystal 6, which is one of materials whose dielectric constant is varied by an electric field, filled in the space surrounded by the sealant 5 between the substrates 1 and 2.

Also, a light source 4 capable of emitting light having a desired wavelength is provided outside the transparent sealant 5 independently of the photonic crystal device A. In the photonic crystal device A, light having a specific wavelength (for example, 1550 nm) emitted from the light source 4 enters the space between the substrates 1 and 2 through the transparent sealant 5.

The substrates 1 and 2 are formed of an ion-doped high-conductive dielectric material, such as Si, and are provided with oxide layers 7 and 8 on the opposing surfaces thereof by, for example, surface oxidation of the substrates. Any material can be used for the substrates 1 and 2, provided that it is highly dielectric, and other conductive, dielectric materials, such as GaP, GaAs, InP, ZnTe, and Ge may be used instead of Si.

When it is supposed that, in these materials, the dielectric constant $\in$ is equivalent to the square of the refractive index n, the dielectric constants are determined as follows: GaP: $(3.45)^2=11.90$, GaAs: $(3.5)^2=12.25$, InP: $(3.29)^2=10.82$, ZnTe: $(3.1)^2=9.61$, and Ge: $(4.1)^2=16.81$. Any of these materials exhibits a high dielectric constant. Preferably, the material of the dielectric substrates has a dielectric constant in the range of 8 to 13.

Since the above-described dielectric materials are originally used for semiconductors and are capable of being given conductivity by ion doing or the like, they can also be used for electrodes.

The rods 3 acting as dielectric members are formed by etching or engraving one of the substrates 1 and 2. In the present invention, these rods are arranged at intervals equal to or several times larger than a specific wavelength of light emitted from the light source 4 to define a periodic structural body 3A. For example, when the transmission and reflection of light having a wavelength of 1550 nm is controlled, the distance between the centers of two adjacent rods 3 is determined in the range of 0.3 to 1.1 $\mu$m and the radius of the rods is determined in the range of 0.07 to 0.25 $\mu$m.

The substrates 1 and 2 are connected to a power-supply unit 10 by interconnecting lines 9A and 9B. When a switching device 11 incorporated in the interconnecting line 9B is turned on, the substrates 1 and 2 are energized to apply a predetermined voltage to the liquid crystal 6 between the substrates 1 and 2; and when the switching device 11 is turned off, the applied voltage is removed.

The dielectric constant of the liquid crystal 6 is different between when an electric field is applied and when it is not. For example, a nematic liquid crystal having a dielectric constant of 2 to 3 may be used. When, for example, an electric field is applied to the nematic liquid crystal normally having a dielectric constant of 2.34, the dielectric constant is changed to 2.56.

Figure 2:
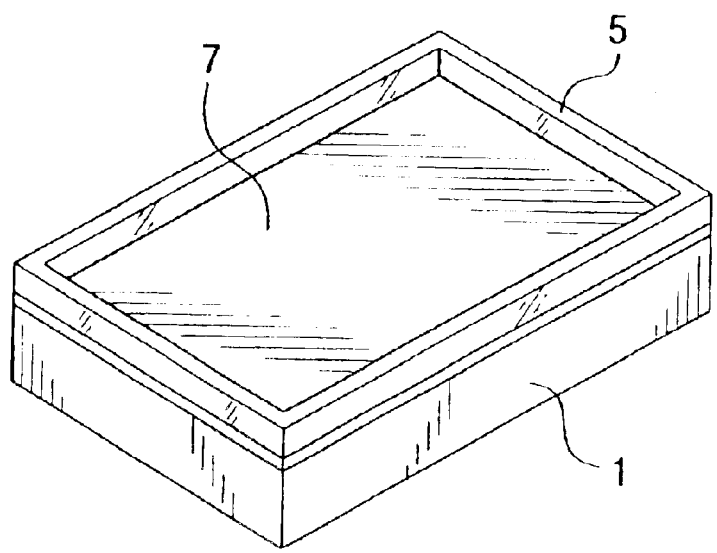
FIG. 2 is an exploded perspective view of one substrate of the photonic crystal device shown in FIG. 1.
Figure 3:
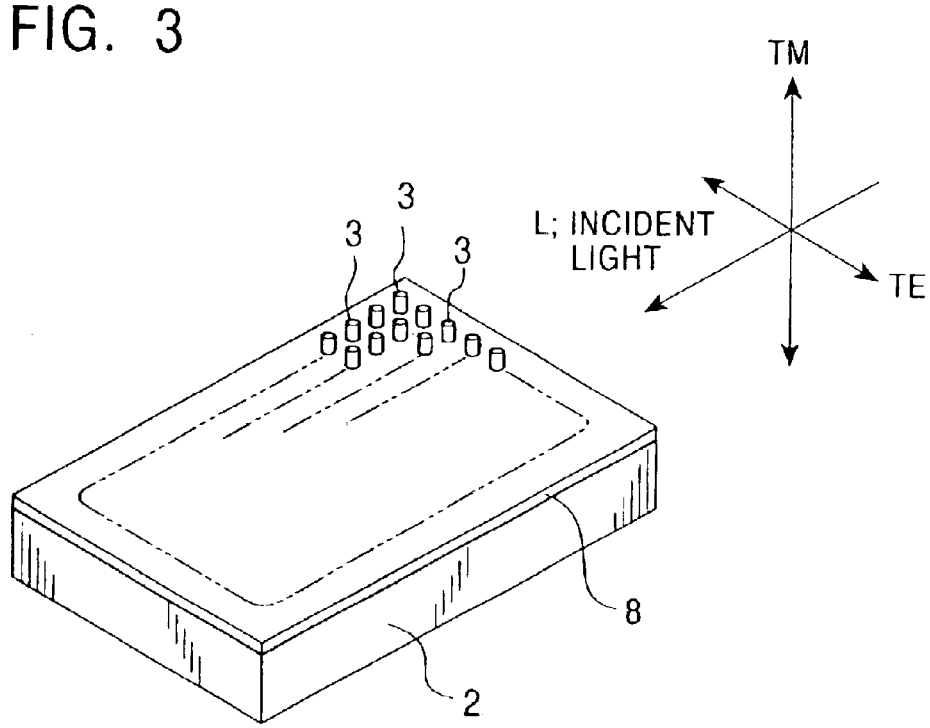
FIG. 3 is an exploded perspective view of the other substrate of the photonic crystal device shown in FIG. 1.

In order to fabricate the photonic crystal device A shown in FIG. 1, one Si substrate 1, which has been doped with ions to have conductivity, is subjected to surface oxidation to form the surface oxidation layer 7. Then, the transparent sealant 5 is disposed in a loop along the sides and on the surface of the surface oxide layer 7, as shown in FIG. 2. Also, the surface of the other Si substrate 2, which has also been doped with ions to have conductivity, is subjected to chemical etching or physical etching, such as ion beam etching, to form a large number of rods (dielectric members) 3, as shown in FIG. 3.

In the case of chemical etching, a resist is applied onto the surface of the substrate 2 and is subsequently subjected to exposure corresponding to the periodic structure of the rods 3. The exposed region of the resist is removed to form a large number of holes by development. Then, chemical etching is performed with the help of these holes. In the case of physical etching, the Si substrate 2 is etched using $SF_6$ plasma or the like to form the rods 3.

Alternatively, Si cylindrical rods may be vertically cut out in the following manner.

First, a resist sensitive to electron beam exposure, for example, polymethyl methacrylate (PMMA), is applied onto a Si wafer, and is exposed to an electron beam to draw a periodic structure. After the exposed region of the resist is removed to form openings, iron atoms are deposited at a thickness of about 1 nm, and then the remaining resist is removed by lift-off. Thus, the iron atoms are aggregated on the surface of the substrate to form iron clusters in the openings. Next, the surface of the substrate is subjected to etching using $SF_6$ plasma. By appropriately setting etching conditions including temperature and gas pressure, the surroundings of the iron clusters are prevented from being etched to remain, and thus Si rods of uniform size can be formed. In this instance, the iron clusters do not serve as etching masks, but as cores for aggregating the products from the plasma, such as $S_xF_x$, to form the etching masks of uniform size. Such an iron cluster can form a mask having an enhanced etching resistance, and this function of the iron cluster helps form Si rods of uniform size. Using this function, the periodic structural body 3A can be formed with reliability in which Si rods of, for example, 40 nm in diameter and 1 $\mu$m in height can be arranged at intervals of 270 nm on the vertexes of a tetragonal or triangular lattice when viewed from above.

In the photonic crystal device A shown in FIG. 1, the periodic structural body 3A defined by the plurality of rods 3 and the liquid crystal 6 filled between the rods 3 form a photonic crystal. When light having a wavelength of, for example, 1550 nm is emitted from the light source 4 into the photonic crystal device A, a photonic bandgap is formed in the photonic crystal. This bandgap shifts on the basis of the presence or absence of an electric field in the liquid crystal 6. The photonic bandgap herein refers to a frequency band in which light having a specific frequency cannot be transmitted.

Figure 4:
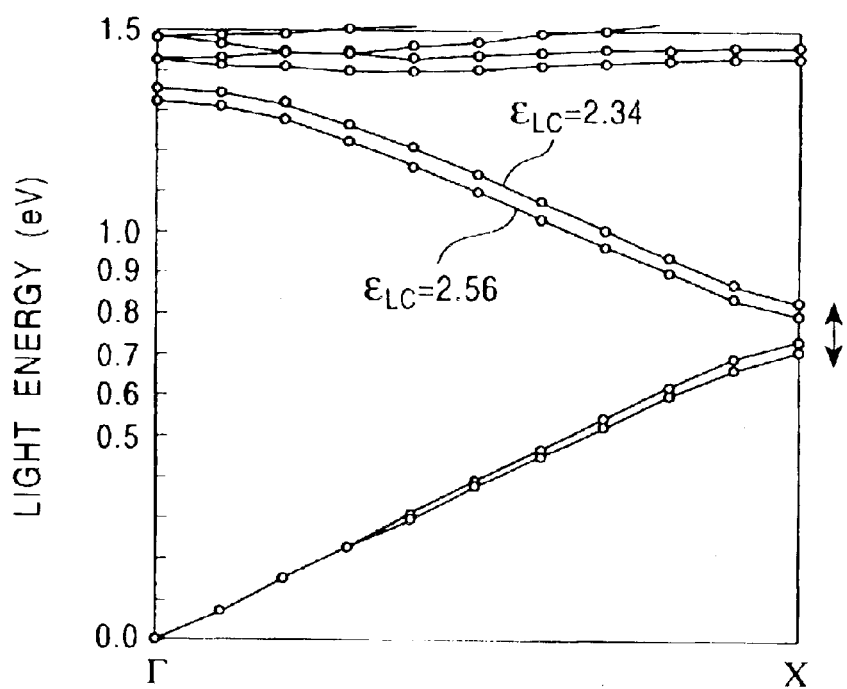
FIG. 4 is an illustration showing the formation of a photonic bandgap.

FIG. 4 shows light energy states in the photonic bandgap, indicated by the horizontal axis, between Γ and X (Γ and X represent typical points in the reciprocal lattice of the photonic crystal) when optical vibration is in a TE mode. The TE mode herein refers to a mode in which the electric vector of incident light L is perpendicular to the rods 3, as shown in FIG. 3; and a TM mode refers to a mode in which the electric vector of incident light is parallel to the rods 3.

For example, when the orientation of a nematic liquid crystal whose refractive index $n_{LC}$ is 1.53 is random, that is, when no electric field is applied to the liquid crystal, the dielectric constant of the liquid crystal $\in_{LC}$ is 2.34, which is derived from the relationship of $\in_{LC}=n_{LC}^2$. The photonic bandgap at point X is, therefore, estimated from FIG. 4 to be in the range of 1517 to 1708 nm (0.82 to 0.73 eV). Hence, the photonic crystal having the periodic structure comprising the rods 3 and the liquid crystal 6 reflects and does not transmit light having a wavelength in the range of 1517 to 1708 nm.

On the other hand, when the liquid crystal is oriented in the direction parallel to the electric vector of incident light, that is, when the major axis of the liquid crystal molecules is oriented in the direction perpendicular to the substrates 1 and 2, the refractive index $n_{LC}$ is 1.6 and thus the dielectric constant of the liquid crystal $\in_{LC}$ is 2.56, which is derived from the relationship of $\in_{LC}=n_{LC}^2$. The photonic bandgap at point X is, therefore, estimated to be in the range of 1580 to 1776 nm (0.78 to 0.70 eV), and is thus shifted from the forgoing band. As a result, the photonic crystal can transmit light other than the light having a wavelength in the range of 1580 to 1776 nm, for example light having a wavelength of 1550 nm.

Hence, when an electric field is not applied to the liquid crystal 6, the periodic structural body 3A comprising the rods 3 and the liquid crystal 6 reflects the light having the wavelength of 1550 nm; and when the electric field is applied, the periodic structural body 3A transmits the same light.

As described above, in the photonic crystal device A shown in FIG. 1, whether light emitted from the light source 4 is transmitted to the side of the periodic structural body 3A opposite the light source 4, as indicated by arrow a, or interrupted is determined on the basis of on/off state of the switch 11. Thus, the photonic crystal device A can serve as an optical shutter for light having a wavelength of 1550 nm.

Accordingly, in the sealant 5, at least the region through which light enters from the light source 4 must be translucent, and preferably transparent. Also, at least the region of the sealant 5 which emits light (the side of the sealant 5 opposite to the side where the light source 4 is disposed) must be translucent, and preferably transparent. More preferably, the sealant 5 is fully transparent.

The substrates 1 and 2 do not need to be entirely formed of a high-dielectric-constant material, as long as the rods 3 are formed of a high-dielectric-constant material. The substrates 1 and 2 may be formed of a common substrate material other than high-dielectric-constant materials and only the rods 3 are formed of a high-dielectric-constant material. Also, the substrates 1 and 2 may be provided with electrode layers for serving as metallic electrodes or transparent electrodes on the surfaces thereof on the liquid crystal sides so that an electric field is applied to the liquid crystal 6 from the electrode layers. In this instance, the substrates 1 and 2 do not need to be formed of conductive Si substrates doped with ions. Thus, the photonic crystal device A may comprise substrates 1 and 2 formed of an insulating material not having a high dielectric constant, electrode layers, such as indium tin oxide (ITO) layers and metallic layers disposed on the opposing surfaces of the substrates, and a plurality of rods formed of a high-dielectric-constant material arranged between the insulating substrates.

In the embodiment, the periodic structural body 3A is in a two dimensional structure in which the rods 3 are arrayed, but it may be in a three dimensional structure. For example, the periodic structural body 3A have a rod arrangement in which rods cross one another and pile up, instead of the simple rod array. The three dimensional structure may have a steric branched or meshed arrangement, a steric arrangement of dielectric members indefinite in shape, or other steric arrangements.

Figure 5:
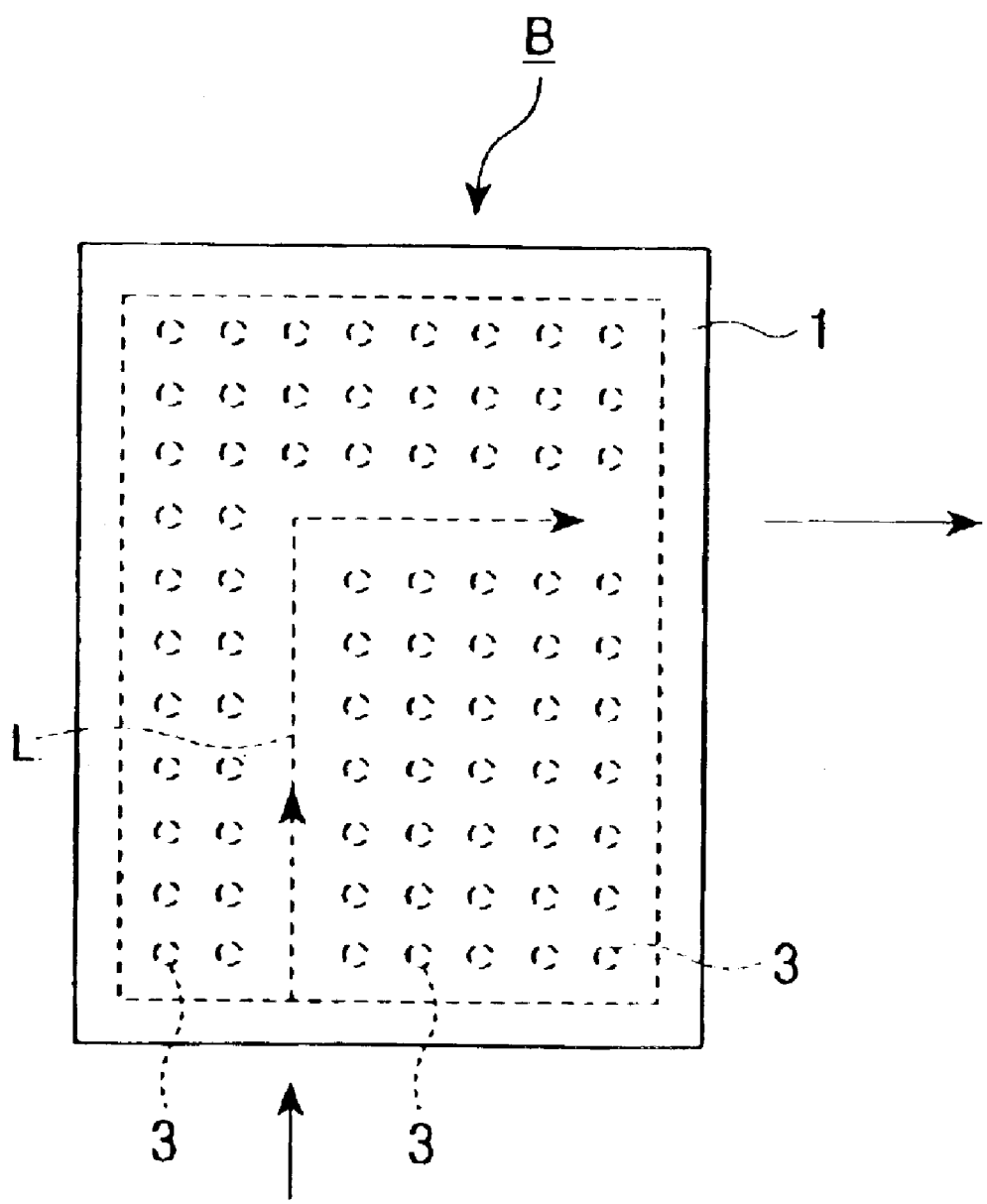
FIG. 5 is a plan view of an optical waveguide according to an embodiment of the present invention.
Figure 6:
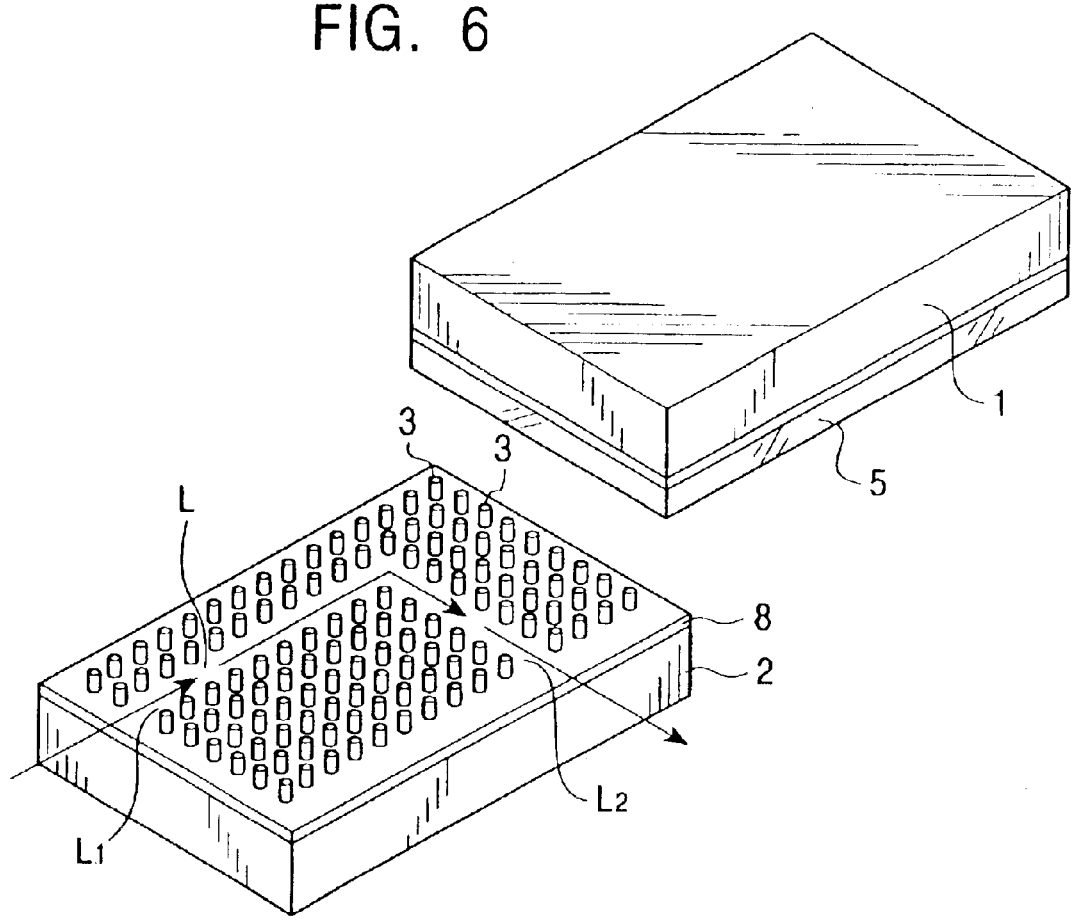
FIG. 6 is an exploded perspective view of an optical waveguide according to an embodiment of the present invention.

FIGS. 5 and 6 shows an optical waveguide device of the present invention. The optical waveguide device B has substantially the same structure as in the photonic crystal device A, except that it has imperfection in the periodic structure thereof. The same parts as in the photonic crystal device A are designated by the same numerals and the description is not repeated.

In the optical waveguide device B, the periodic structural body 3A comprises the rods (dielectric members) 3 surrounded by the substrates 1 and 2 and the sealant 5 and filled with the liquid crystal 6, as in the photonic crystal device A.

However, some of the plurality of rods 3 are eliminated so as to form an L-shaped waveguide L. The waveguide L has a light inlet L1 at the middle of the narrow side of the substrate 2 and a light outlet L2 at a position of the longitudinal side of the substrate 2. The inlet L1 extends to the center of the substrate 2 in the length direction and turns to the right at an angle of 90° to the outlet L2 so that the L-shaped waveguide L is formed.

In this structure, the elimination of the rods 3 from the periodic structural body 3A means that an imperfection is introduced to the periodic structural body 3A. The region having the imperfection is not affected by any photonic bandgap.

Specifically, when the orientation of the nematic liquid crystal is random, that is, when no electric field is applied, the photonic bandgap is in the range of 1517 to 1708 nm and the photonic crystal, consequently, reflects light having a wavelength in the range of 1517 to 1708 nm. However, the light can be present, that is, can be transmitted, in the waveguide L. Thus, while the light incident from the inlet L1 can be transmitted along the waveguide L, the light is not present in the region outside the waveguide L. Also, since light deviating from the waveguide L is reflected at the walls of the waveguide L defined by the periodic structural body 3A, the light is surely transmitted along only the waveguide L and emitted from the outlet L2. Thus, the waveguide L can serve as an optical waveguide.

On the other hand, when the liquid crystal molecules are oriented in the direction parallel to the electric vector of incident light, that is, when the major axes of the liquid crystal molecules are oriented in the direction perpendicular to the substrates 1 and 2, the photonic bandgap is shifted to the range of 1580 to 1776 nm and, consequently, the photonic crystal does not transmit light having a wavelength in this range, but can transmit light having any other wavelength, for example, 1550 nm.

Then, the light of 1550 nm entering from the inlet L1 travels straight in the incident direction along the entire periodic structural body 3A as well as the waveguide L. In other words, the light of 1550 nm travels straight from the inlet L1 to the opposite side of the substrate 2. If the sealant 5 is transparent, the light is emitted to outside of the substrate 2; if the sealant 5 is opaque, the light is not emitted to the outside.

Thus, the optical waveguide B is achieved by eliminating some of the rods 3 from the periodic structural body. Moreover, the waveguide L can be formed so as to correspond to the intervals on the order of microns or submicrons (for example, 270 nm, as mentioned above) at which the rods are arranged. On the other hand, in a known quartz waveguide including an optical fiber, the optical fiber has a dend radius limit and thus needs a dend radius of several hundred microns. However, the structure of the present embodiment facilitates a curved waveguide on the order of microns or submicrons.

Moreover, only by eliminating some of rods 3 according to need, the waveguide can be formed in a desired shape, and thus a complicated waveguide can be achieved.

Figure 7:
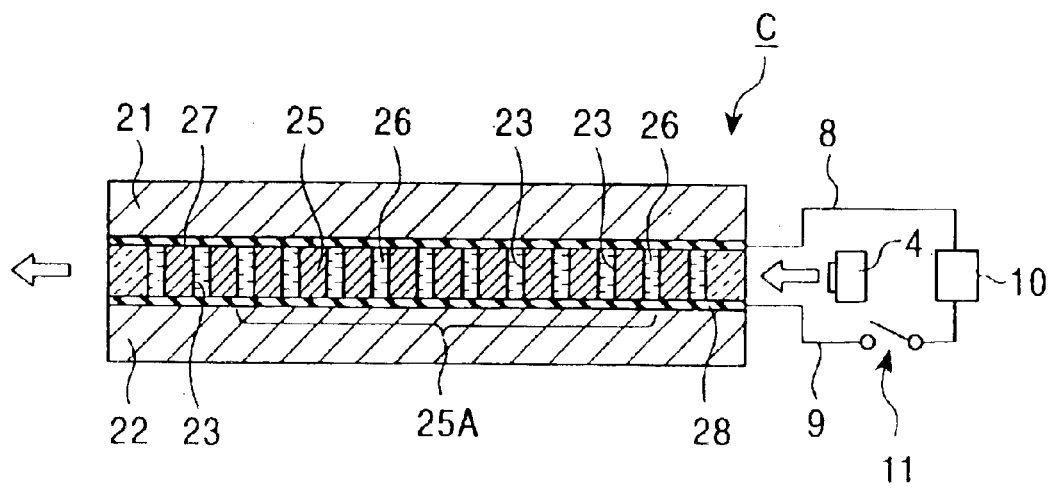
FIG. 7 is a sectional view of a photonic crystal device according to a second embodiment of the present invention.

FIG. 7 shows another photonic crystal device of the present invention. The photonic crystal device C comprises substrates 21 and 22 opposing in substantially parallel with each other separately, a platy main body 25 formed of a high dielectric material, such as S1, between the substrates 21 and 22, a plurality of holes 23 formed in the main body 25 with a period substantially equal to an optical wavelength, and a liquid crystal 26, which is a variable-dielectric-constant material, filled in the holes.

In addition, an electrode layer 27 is disposed between the substrate 21 and the main body 25, and another electrode layer 28 is also disposed between the substrate 22 and the main body 25. These two electrodes 27 and 28 are connected to a power-supply unit 10 and a switching device 11 by interconnecting lines 8 and 9, as in the foregoing embodiment.

A light source 24, such as a laser, capable of emitting light having a desired wavelength is provided outside the main body 25 independently of the photonic crystal device C.

In the photonic crystal device C, a periodic structural body 25A is achieved by forming the plurality of holes 23 in the main body 25 with a period substantially equal to an optical wavelength. The holes are filled with the liquid crystal 26, thus forming a photonic crystal.

The photonic crystal device C also leads to the same effect as in the foregoing photonic crystal device A and can thus be used as an optical shutter for light having a specific wavelength. Furthermore, by eliminating some of the holes 23 from the photonic crystal device C, an imperfection can be introduced to serve as an optical waveguide, and thus an optical waveguide device can also be achieved.

Figure 8:
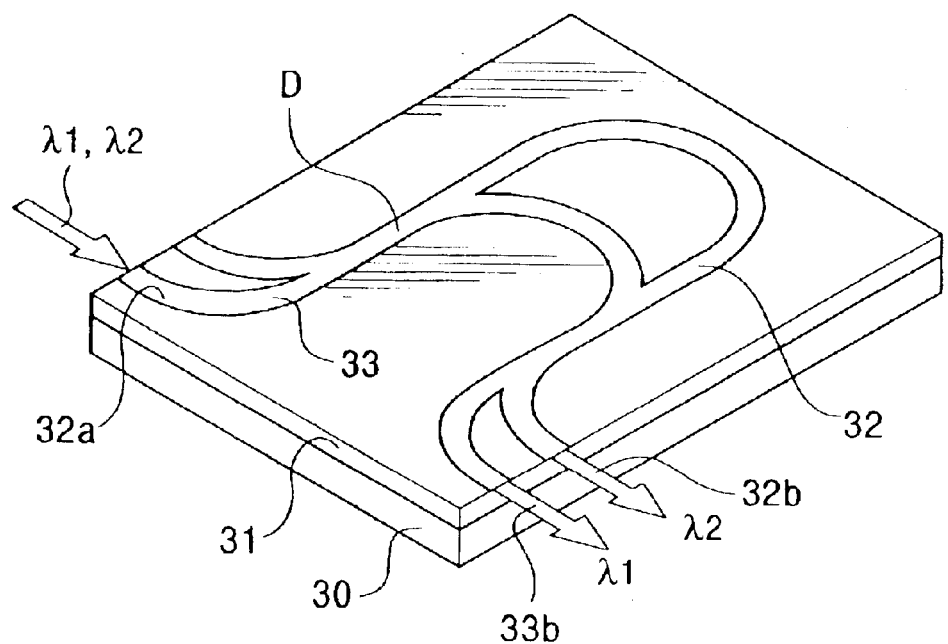
FIG. 8 is a perspective view of a planar light-wave circuit including a photonic crystal device of the present invention.

FIG. 8 shows a planar light-wave circuit including a photonic crystal device of the present invention. The planar light-wave circuit (optical multiplexing/demultiplexing device) D has Ω-shaped waveguides 32 and 33 having a Ω-like shape in plan view between substrates 30 and 31. The Ω-shaped wave guides 32 and 33 are partly displaced with respect to each other in the longitudinal direction of the Ω-shape. In this structure, when complex light having wavelengths λ1 and λ2 is introduced from an inlet 32a at one end of the optical waveguide 32, the light is divided into two lines on the basis of the wavelengths λ1 and λ2 and is emitted from outlets 32b and 33b at the other end, respectively. Here the region in which the Ω-shaped optical waveguides 32 and 33 overlap each other serves as the Mach-Zehnder interferometer.

The planar light-wave circuit D includes the same periodic structural body 3A as that of the first embodiment except that some of the plurality of rods 3 are eliminated so as to form the Ω-shape. The optical waveguides 32 and 33 correspond to the regions in which the rods 3 are eliminated. Alternatively, the periodic structural body 25A of the third embodiment having the plurality of the holes 23 may be applied to the Ω-shaped waveguides 32 and 33.

Figure 9:
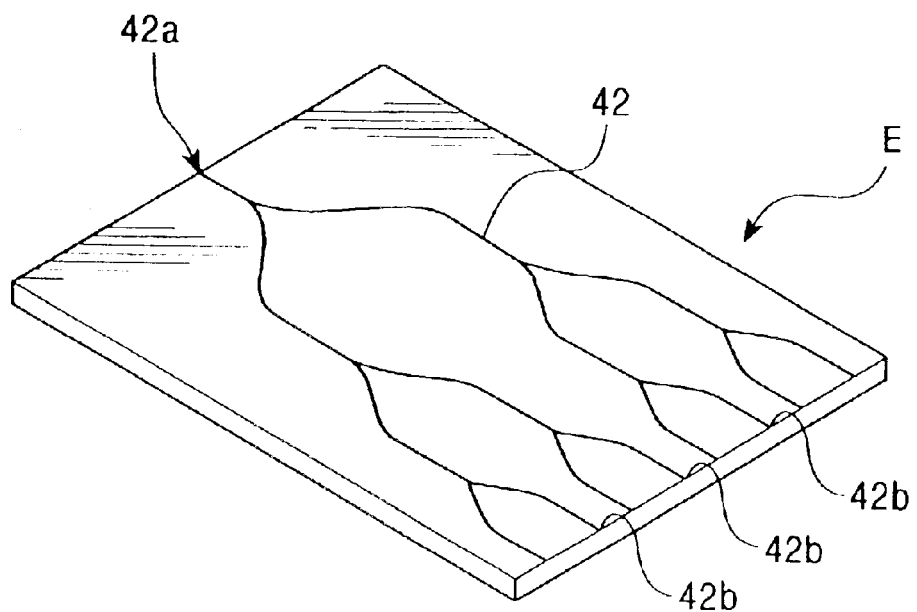
FIG. 9 is a perspective view of a beam splitter including a photonic crystal device of the present invention.

FIG. 9 shows an optical splitter including a photonic crystal device of the present invention. The optical splitter (optical multiplexing/demultiplexing device) E has a branched optical waveguide 42 between substrates 40 and 41. In this structure, when complex light having wavelengths λ1 and λ2 is introduced from an inlet 42a at one end of the optical waveguide 42, the light is divided on the basis of the wavelengths and emitted from outlets 42b separately.

In this instance, the optical splitter E includes the same periodic structural body 3A as that of the photonic crystal device A of the first embodiment, except that some of the rods 3 are eliminated.

Figure 10:
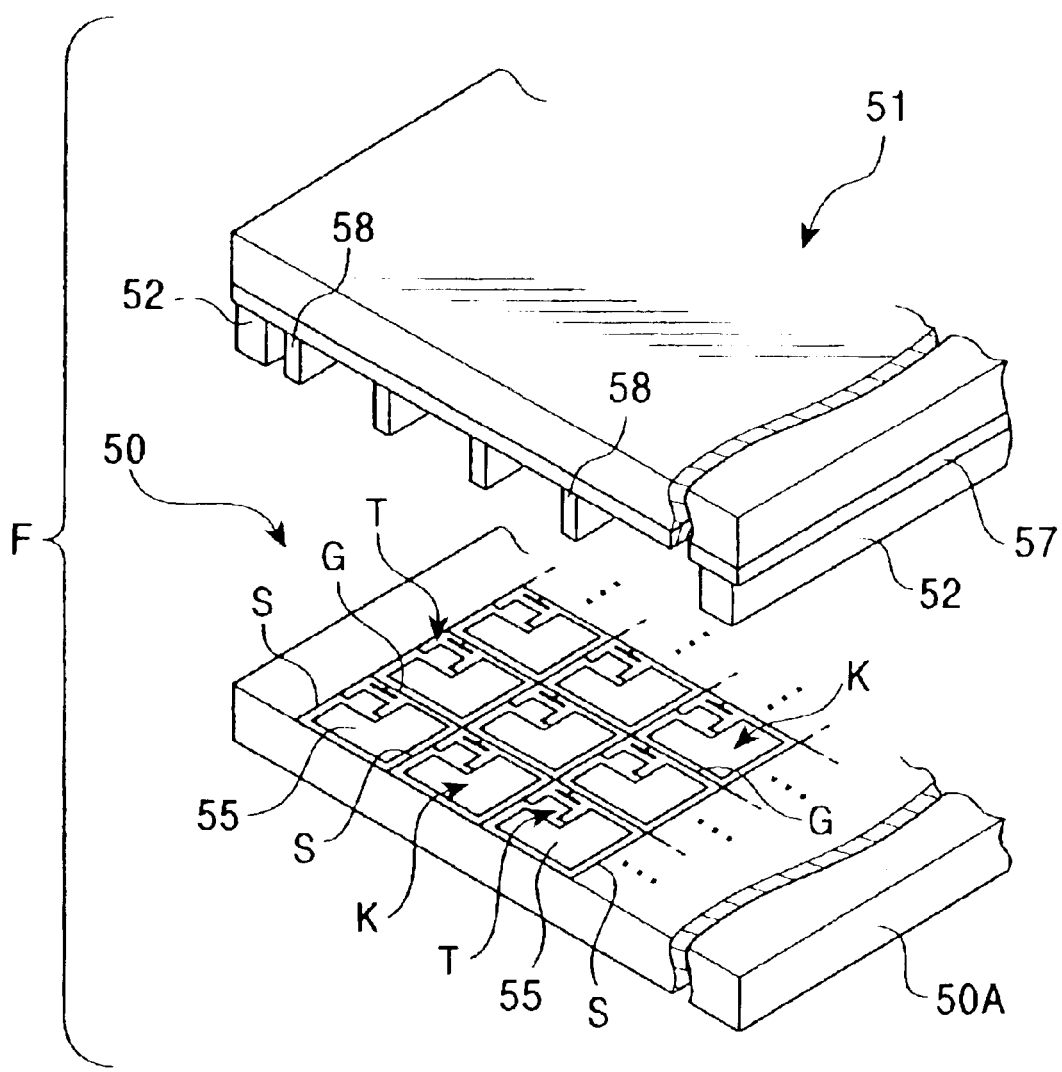
FIG. 10 is an exploded perspective view of an optical waveguide according to another embodiment of the present invention.
Figure 11:
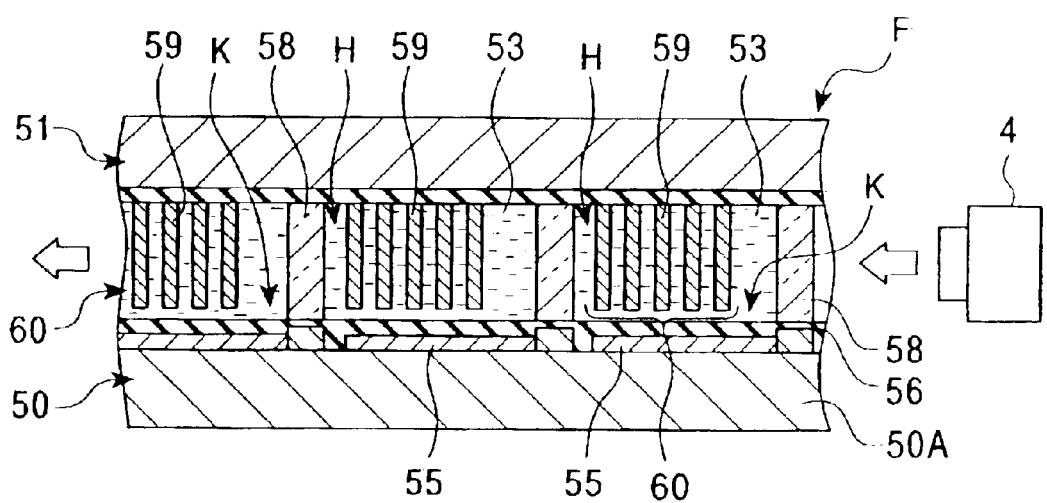
FIG. 11 is a fragmentary sectional view of the optical waveguide shown in FIG. 10.
Figure 12:
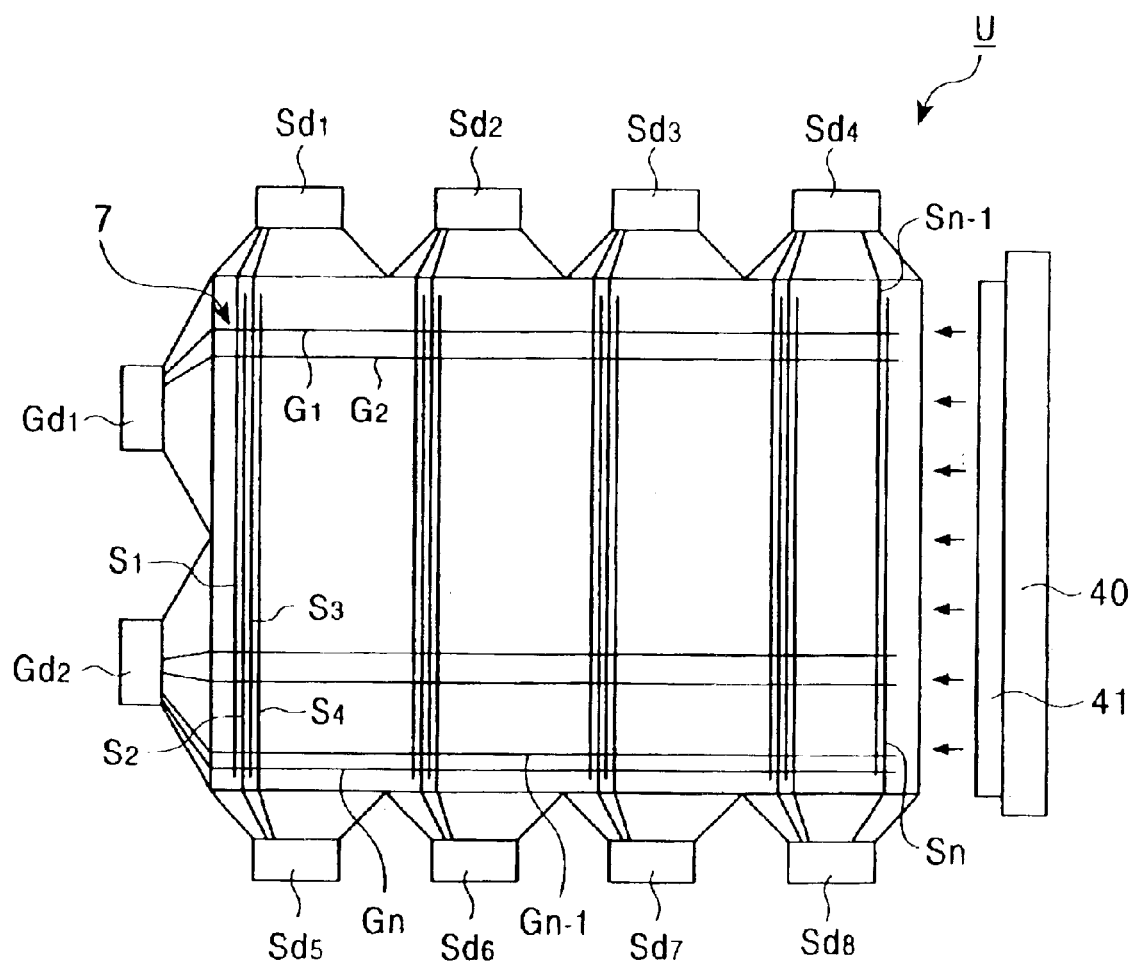
FIG. 12 is a schematic illustration of a driving unit comprising the optical waveguide shown in FIG. 10 and a driver.

FIGS. 10 to 12 show a multi-channel optical waveguide of the present invention. The optical waveguide F includes a pair of substrates 50 and 51 opposing each other with a predetermined space therebetween, a sealant 52 for joining the sides of the substrates 50 and 51, and a liquid crystal 53, which is one of the variable-dielectric materials, filled in the space surrounded by the substrates 50 and 51 and the sealant 52.

One substrate 50 is a thin-film transistor array substrate in which a plurality of gate lines G and a plurality of source lines S extend in a matrix in plan view on the main substrate 50A formed of Si or the like. The regions surrounded by the gate lines G and the source lines S each define a driving region K. Each driving region K has a driving electrode 55 formed of a conductive material, such as ITO or a metal, on the substrate 50. Thin-film transistor elements T are disposed in respective driving regions K to serve as three-terminal switching elements in the boundaries between the driving electrodes 55 and the gate lines G and between the driving electrodes 55 and the source lines S. In addition, these elements and lines are covered with a planarizing layer 56.

The other substrate 51 is used for a common electrode and is provided with an electrode layer 57 having a size covering all the driving regions K on the surface thereof on the liquid crystal side. Division walls 58 are formed in a grid manner in plan view on the electrode layer 57 for partitioning the driving regions K disposed on the substrate 50. Also, a plurality of cylindrical rods (dielectric members) 59 are formed by etching the Si substrate in the spaces surrounded by the division walls 58, thus defining a periodic structural body 60.

The division walls 58 are in contact with the planarizing layer 56 on the substrate 50 so as to be aligned with the boundaries between the driving regions K, and the sealant 52 is in contact with the edges of the substrate 50. Thus, the substrates 50 and 51 are bonded together so that conversion regions H are formed corresponding to the driving regions K in the spaces surrounding by the division walls 58. The conversion regions are filled with a liquid crystal 53. Thus, a photonic crystal is formed which comprises the conversion regions H including the plurality of cylindrical rods 59 and the liquid crystal 53 filled between the rods 59, between the substrates 50 and 51.

FIG. 10 shows nine driving regions K with 3 rows and 3 columns; however, in practice, a desired number of the driving regions K are provided for a multi-channel optical waveguide device.

FIG. 12 shows an entire structure of a multi-channel driving unit U including a driving LSI disposed by the sides of the substrates 50 and 51 shown in FIGS. 10 and 11. The driving unit U has the substrates 50 and 51 and desired numbers of driving regions K, source lines S1 to Sn, and gate lines G1 to Gn. A plurality of gate drivers Gd1 to Gd2 for driving scanning lines (gate lines) are disposed at the left side of the substrates 50 and 51. A plurality of source drivers Sd1 to Sd8 for driving signal lines (source lines) are disposed at upper and lower sides of the substrates 50 and 51.

These gate and source drivers have several hundred terminals so that each source driver drives several hundred source lines and each gate driver drives several hundred gate lines.

The driving unit U also has a light source 40 at the right side of the substrates 50 and 51. The light source 40 emits light having a wavelength of, for example, 1550 nm from a light emitters 41 having a total length substantially equal to the vertical width of the substrates 50 and 51.

In the multi-channel driving unit U shown in FIG. 12, some of the gate drivers Gd1 and Gd2 and source drivers Sd1 to Sd8 energize desired conversion regions H to select whether or not an electric field is applied to the liquid crystal 53 in the conversion regions H.

For example, in order to guide light emitted from the emitter 41 corresponding to the extension of the gate line G1, in the emitting direction along the gate line G1, the gate electrodes of the thin-film transistors T in all the conversion regions present along the gate line G1 are energized by the gate driver Gd1 and the source electrodes of the same thin-film transistors T is simultaneously energized by the source drivers Sd1 to Sd8, with the electrode layer 57 on the substrate 51 side energized. As a result, all the photonic bandgaps in the corresponding conversion regions H are shifted to transmit the light. In contrast, when the current is removed, the light is interrupted.

In order to guide light emitted from the light emitters 41 in a desired direction, the electrodes in the conversion regions H present along the desired direction are energized to apply an electric field to the liquid crystal 53 in the same conversion regions H. Thus, each light from the emitters 41 of the light source 40 disposed by one side of the substrates 50 and 51 can be guided in any direction toward each of the other sides.

Thus, the driving unit U shown in FIG. 12 can achieve an optical waveguide capable of arbitrarily guiding light from the light source 40 having a specific wavelength in any direction toward each of three sides of the pair of the substrates 50 and 51.

In the present embodiment, the thin-film transistors T are used as three-terminal elements to switch the energization of the driving electrodes 55. However, thin-film diode switching elements, which are well known as two-terminal elements having metal layers separated by an insulating layer, may be used as the switching elements for the driving electrodes 55.

Also, the driving unit U may have a structure in which a pair of substrates oppose each other such that a plurality of strap-shaped electrodes parallel to each other on one substrate intersect other plurality of strap-shaped electrodes parallel to each other on the other substrate at an angle of 90°. The intersections of the upper electrodes and the lower electrodes define conversion regions. The conversion regions are each surrounded by division walls. The upper electrodes and the lower electrodes are selectively energized to change the dielectric constant of the regions between energized upper and lower electrodes. Thus, light is guided by controlling the photonic bandgap in each conversion region.

EXAMPLES

One surface of a Si substrate was etched by photolithography to form a large number of cylindrical rods. A nematic liquid crystal having a refractive index of 1.53 and a dielectric constant of 2.34 was filled between the rods, and thus a photonic crystal device having a periodic structural body was fabricated. The refractive index and the dielectric constant of the nematic liquid crystal change to 1.6 and 2.56, respectively, when the liquid crystal molecules are oriented so as to be parallel to the vector of incident light.

Figure 13:
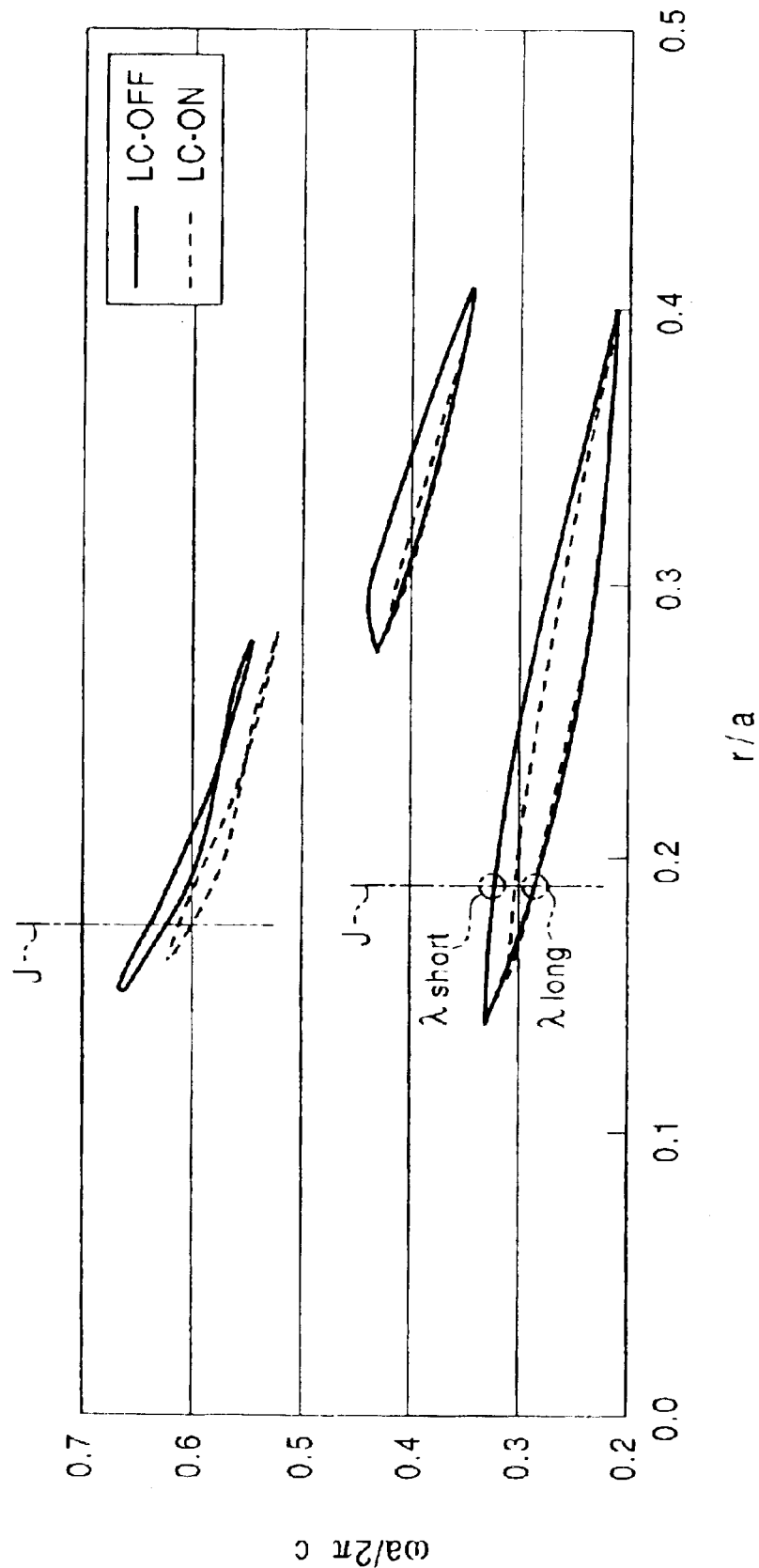
FIG. 13 is a graph showing the relationship between the normalized light energy and the r/a value of a photonic crystal device comprising Si cylindrical rods arranged on the vertexes in a tetragonal lattice and a liquid crystal filled between the rods.

FIG. 13 shows the relationship between the normalized light energy and the ratio (r/a) of the radius (r) of the Si cylindrical rods arranged in a tetragonal lattice in plan view to the distance (a) between the centers of the rods, in a TM mode. In this instance, the distance (a) was set at an adequate value in the range of 0.350 to 1.032 $\mu$m and the radius (r) was also set at an adequate value in the range of 0.076 to 0.236 $\mu$m. The measurement was performed both when an electric field was applied to the liquid crystal and when no electric field was applied.

FIG. 13 shows that the photonic bandgap is varied on the basis whether or not an electric field is applied to the liquid crystal. When the lying looped lines representing photonic bandgaps in FIG. 13 are divided vertically by additional line J parallel to the vertical axis, lower intersections of the looped lines and additional line J are expressed by $\lambda_{long}$ and upper intersections are expressed by $\lambda_{short}$. When an electric field is applied to the liquid crystal, each intersection is expressed by $\lambda_{long}$ (ON) or $\lambda_{short}$ (ON); when no electric field is applied, each intersection is expressed by $\lambda_{long}$ (OFF) or $\lambda_{short}$ (OFF). Table 1 shows the results when a first bandgap $\lambda_{midgap}$ (incident optical wavelength corresponding to the middle of the bandgap when the liquid crystal is off) is defined as 1.630 $\mu$m.

TABLE 1

| a ($\mu$m) | r ($\mu$m) | $\lambda_{long}$ (OFF) (nm) | $\lambda_{short}$ (OFF) (nm) | $\lambda_{long}$ (ON) (nm) | $\lambda_{short}$ (ON) (nm) |
|---|---|---|---|---|---|
| 0.542 | 0.076 | 1642.485 | 1637.523 | | |
| 0.532 | 0.080 | 1668.276 | 1612.667 | | |
| 0.489 | 0.098 | 1764.332 | 1532.038 | | |
| 0.449 | 0.112 | 1794.160 | 1510.236 | 1808.629 | 1584.947 |
| 0.413 | 0.124 | 1789.091 | 1513.846 | 1796.870 | 1589.538 |
| 0.377 | 0.132 | 1722.374 | 1565.145 | 1730.275 | 1605.106 |
| 0.350 | 0.140 | 1651.604 | 1628.558 | | |

As shown in Table 1, in the case of, for example, light having a wavelength of 1550 nm, this wavelength is present between $\lambda$long (OFF) and $\lambda$short (OFF) when a is 0.449 $\mu$m and 0.413 $\mu$m. Thus, a photonic bandgap acts on light having a wavelength between $\lambda$long (OFF) and $\lambda$short (OFF). Consequently, the light of 1550 nm cannot be present in the photonic crystal and thus cannot be transmitted.

In contrast, the wavelength of 1550 nm is outside the wavelength band between $\lambda$long (ON) and $\lambda$short (ON).

Therefore, when an electric field is applied to the liquid crystal, the light of 1550 nm can be transmitted. Thus, the object of the present invention is achieved.

When the wavelength band between λlong (OFF) and λshort (OFF) shown in Table 1 shifts from the wavelength band between λlong (ON) and λshort (ON) shown in Table 1, by using light having a wavelength corresponding to the shifted wavelength band, transmission and interruption of light can be switched on the basis of the presence or absence of an electric field in the liquid crystal.

Table 2 shows the results when a second bandgap (a plurality of bandgaps are formed, and are herein referred to as a first bandgap, a second bandgap, and so on in increasing order of energy) is defined as 1.550 μm.

TABLE 2

| a (μm) | r (μm) | $\lambda_{long}$ (OFF) (nm) | $\lambda_{short}$ (OFF) (nm) | $\lambda_{long}$ (ON) (nm) | $\lambda_{short}$ (ON) (nm) |
|---|---|---|---|---|---|
| 0.667 | 0.186 | 1571.821 | 1568.183 | | |
| 0.664 | 0.199 | 1623.741 | 1519.703 | 1639.778 | 1604.130 |
| 0.604 | 0.212 | 1624.866 | 1518.709 | 1633.649 | 1578.198 |
| 0.552 | 0.221 | 1585.790 | 1554.521 | | |
| 0.542 | 0.222 | 1574.564 | 1565.462 | | |

When the wavelength band between $\lambda_{long}$ (OFF) and $\lambda_{short}$ (OFF) shown in Table 2 shifts from the wavelength band between $\lambda_{long}$ (ON) and $\lambda_{short}$ (ON) shown in Table 2, by using light having a wavelength corresponding to the shifted wavelength band, transmission and interruption of light can be switched on the basis of the presence or absence of an electric field in the liquid crystal.

For example, in the case of light having a wavelength of 1550 nm, this wavelength is present between $\lambda_{long}$ (OFF) and $\lambda_{short}$ (OFF) when a is 0.664 μm and 0.604 μm. Thus, a photonic bandgap acts on light having a wavelength between $\lambda_{long}$ (OFF) and $\lambda_{short}$ (OFF). Consequently, the light of 1550 nm cannot be present in the photonic crystal and thus cannot be transmitted. In contrast, the wavelength of 1550 nm is present outside the wavelength band between $\lambda_{long}$ (ON) and $\lambda_{short}$ (ON). Therefore, when an electric field is applied to the liquid crystal, the light of 1550 nm can be transmitted. Thus, the object of the present invention is achieved.

FIG. 3 shows the results when a third bandgap (a plurality of bandgaps are present, and are herein referred to as a first bandgap, a second bandgap, a third bandgap, and so on in increasing order of energy) is defined as 1.570 μm.

TABLE 3

| a (μm) | r (μm) | $\lambda_{long}$ (OFF) (nm) | $\lambda_{short}$ (OFF) (nm) | $\lambda_{long}$ (ON) (nm) | $\lambda_{short}$ (ON) (nm) |
|---|---|---|---|---|---|
| 1.032 | 0.156 | 1552.331 | 1547.676 | | |
| 1.025 | 0.159 | 1559.437 | 1540.677 | | |
| 1.014 | 0.162 | 1561.941 | 1538.240 | | |
| 0.993 | 0.169 | 1563.425 | 1536.803 | 1630.172 | 1614.268 |
| 0.968 | 0.174 | 1566.303 | 1534.033 | 1626.849 | 1597.318 |
| 0.948 | 0.180 | 1566.653 | 1533.697 | 1631.368 | 1592.983 |
| 0.931 | 0.186 | 1566.961 | 1533.402 | 1632.939 | 1591.068 |
| 0.892 | 0.205 | 1551.348 | 1548.655 | 1615.987 | 1604.362 |
| 0.873 | 0.218 | 1558.304 | 1541.784 | 1613.031 | 1607.090 |
| 0.864 | 0.225 | 1556.982 | 1543.080 | 1615.187 | 1606.180 |
| 0.844 | 0.236 | 1551.425 | 1548.578 | 1610.639 | 1604.515 |

When the wavelength band between $\lambda_{long}$ (OFF) and $\lambda_{short}$ (OFF) shown in Table 3 shifts from the wavelength band between $\lambda_{long}$ (ON) and $\lambda_{short}$ (ON) shown in FIG. 3, by using light having a wavelength corresponding to the shifted wavelength band, transmission and interruption of light can be switched on the basis of the presence or absence of an electric field in the liquid crystal.

For example, in the case of light having a wavelength of 1550 nm, this wavelength is present between $\lambda_{long}$ (OFF) and $\lambda_{short}$ (OFF) when a is 0.948 μm and 0.931 μm. Thus, a photonic bandgap acts on light having a wavelength between $\lambda_{long}$ (OFF) and $\lambda_{short}$ (OFF). Consequently, the light of 1550 nm cannot be present in the photonic crystal and thus cannot be transmitted. In contrast, the wavelength of 1550 nm is present outside the wavelength band between $\lambda_{long}$ (ON) and $\lambda_{short}$ (ON). Therefore, when an electric field is applied to the liquid crystal, the light of 1550 nm can be transmitted. Thus, the object of the present invention is achieved.

Figure 14:
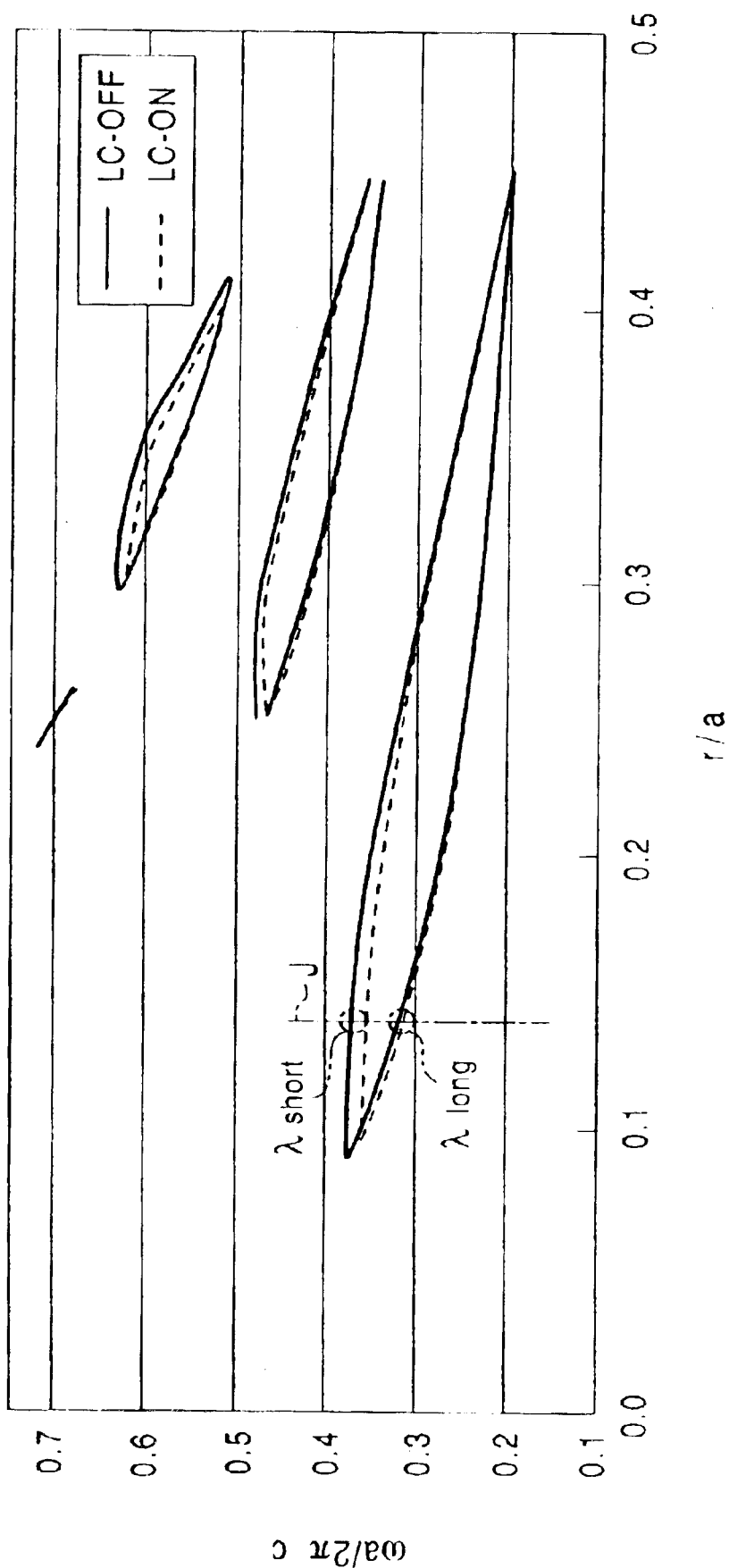
FIG. 14 is a graph showing the relationship between the normalized light energy and the r/a value of a photonic crystal device comprising Si cylindrical rods arranged on the vertexes in a triangular lattice and a liquid crystal filled between the rods.

FIG. 14 shows the relationship between the normalized light energy and the ratio (r/a) of the radius (r) of the Si cylindrical rods arranged in a triangular lattice in plan view to the distance (a) between the centers of rods, in a TM mode. In this instance, the distance (a) was set at an adequate value in the range of 0.514 to 0.561 μm and the radius (r) was also set at an adequate value in the range of 0.056 to 0.103 μm. The measurement was performed both when an electric field was applied to the liquid crystal and when no electric field was applied.

FIG. 14 shows that the photonic bandgap is varied on the basis whether or not an electric field is applied to the liquid crystal.

Table 4 shows the results when the first bandgap $\lambda_{midgap}$ is defined as 1.660 μm, as in FIG. 13.

TABLE 4

| a (μm) | r (μm) | $\lambda_{long}$ (OFF) (nm) | $\lambda_{short}$ (OFF) (nm) | $\lambda_{long}$ (ON) (nm) | $\lambda_{short}$ (ON) (nm) |
|---|---|---|---|---|---|
| 0.561 | 0.084 | 1827.622 | 1520.542 | 1857.881 | 1584.972 |
| 0.514 | 0.103 | 1917.052 | 1463.732 | 1938.755 | 1520.030 |
| 0.466 | 0.117 | 1935.519 | 1453.146 | 1943.583 | 1495.064 |
| 0.422 | 0.127 | 1894.484 | 1477.168 | 1894.484 | 1503.452 |
| 0.356 | 0.142 | 1754.039 | 1575.531 | 1754.039 | 1589.598 |
| 0.514 | 0.103 | 1917.052 | 1463.732 | 2594.798 | 2568.850 |

When the wavelength band between $\lambda_{long}$ (OFF) and $\lambda_{short}$ (OFF) shown in Table 4 shifts from the wavelength band between $\lambda_{long}$ (ON) and $\lambda_{short}$ (ON) shown in FIG. 4, by using light having a wavelength corresponding to the shifted wavelength band, transmission and interruption of light can be switched on the basis of the presence or absence of an electric field in the liquid crystal.

For example, in the case of light having a wavelength of 1550 nm, this wavelength is present between $\lambda_{long}$ (OFF) and $\lambda_{short}$ (OFF) when a is 0.561 μm. Thus, a photonic bandgap acts on light having a wavelength between $\lambda_{long}$ (OFF) and $\lambda_{short}$ (OFF). Consequently, the light of 1550 nm cannot be present in the photonic crystal and thus cannot be transmitted. In contrast, the wavelength of 1550 nm is present outside the wavelength band between $\lambda_{long}$ (ON) and $\lambda_{short}$ (ON). Therefore, when an electric field is applied to the liquid crystal, the light of 1550 nm can be transmitted. Thus, the object of the present invention is achieved.

One surface of a Si substrate was etched by photolithography to form a large number of holes. A nematic liquid crystal having a refractive index of 1.53 and a dielectric constant of 2.34 was filled in the holes, and thus a photonic crystal device having a periodic structural body was fabricated.

Figure 15:
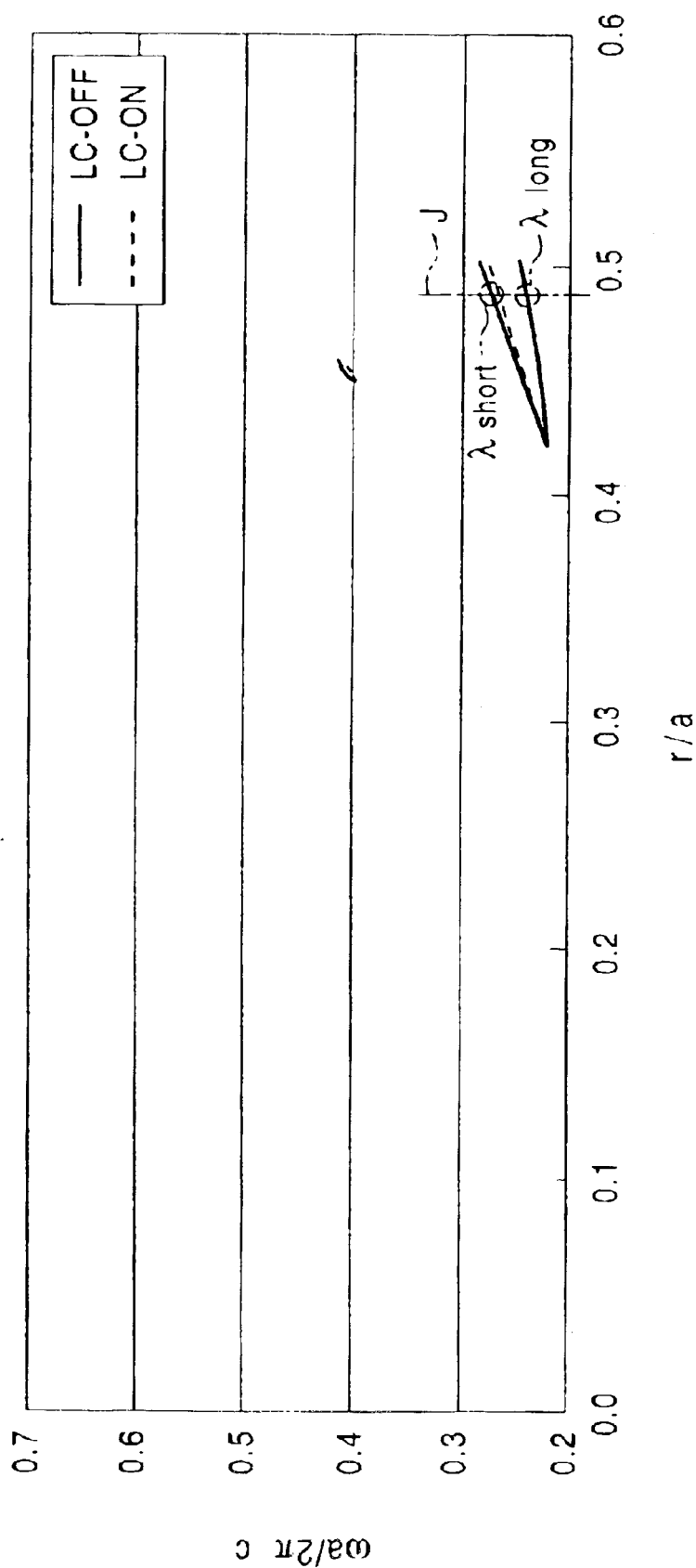
FIG. 15 is a graph showing the relationship between the normalized light energy and the r/a value of a photonic crystal device comprising holes formed at positions in a Si substrate corresponding to the vertexes in a tetragonal lattice and a liquid crystal filled in the holes.
Figure 16:
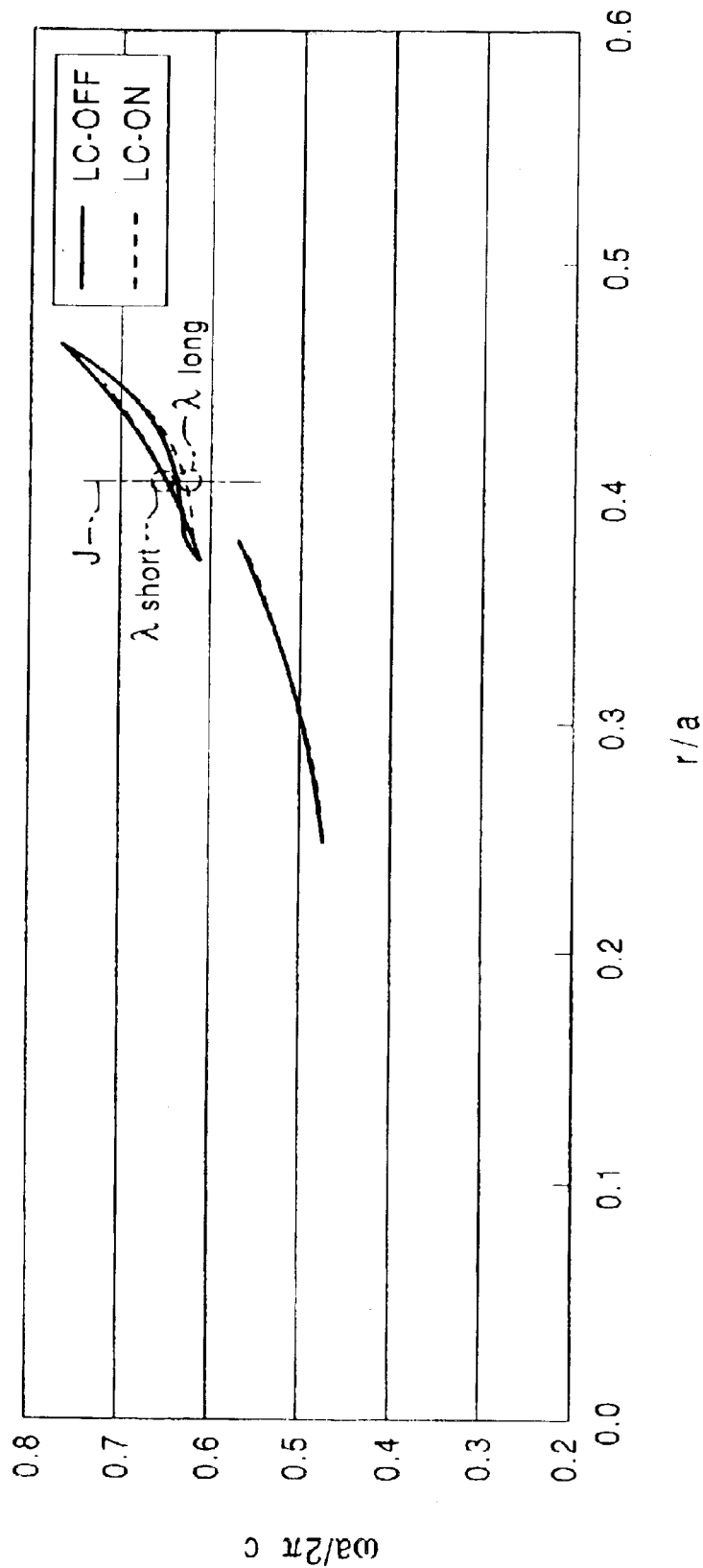
FIG. 16 is a graph showing the relationship between the normalized light energy and the r/a value of a photonic crystal device comprising holes formed at positions in a Si substrate corresponding to the vertexes in a triangular lattice and a liquid crystal filled in the holes.

The refractive index and the dielectric constant of the nematic liquid crystal change to 1.6 and 2.56, respectively, when the liquid crystal molecules are oriented so as to be parallel to the vector of incident light. FIG. 15 shows the relationship between the normalized light energy and the ratio (r/a) of the radius (r) of the holes arranged in a tetragonal lattice in plan view to the distance (a) between the centers of the holes, in a TM mode. In this instance, the distance (a) was set at an adequate value in the range of 0.384 to 0.439 μm and the radius (r) was also set at an adequate value in the range of 0.173 to 0.220 μm. The measurement was performed both when an electric field was applied to the liquid crystal and when no electric field was applied.

FIG. 15 shows that the photonic bandgap is varied on the basis whether or not an electric field is applied to the liquid crystal. When the lying lines representing photonic bandgaps in FIG. 15 are divided vertically by additional line J parallel to the vertical axis, lower intersections of the looped lines and additional line J are expressed by $\lambda_{long}$ and upper intersections are expressed by $\lambda_{short}$. When an electric field is applied to the liquid crystal, each intersection is expressed by $\lambda_{long}$ (ON) or $\lambda_{short}$ (ON); when no electric field is applied, each intersection is expressed by $\lambda_{long}$ (OFF) or $\lambda_{short}$ (OFF). Table 5 shows the results when the first bandgap $\lambda_{midgap}$ is defined as 1.630 μm.

TABLE 5

| a (μm) | r (μm) | $\lambda_{long}$ (OFF) (nm) | $\lambda_{short}$ (OFF) (nm) | $\lambda_{long}$ (ON) (nm) | $\lambda_{short}$ (ON) (nm) |
| --- | --- | --- | --- | --- | --- |
| 0.384 | 0.173 | 1676.266 | 1586.219 | 1676.266 | 1612.878 |
| 0.405 | 0.190 | 1709.093 | 1557.904 | 1716.335 | 1601.008 |
| 0.428 | 0.210 | 1739.329 | 1533.602 | 1753.586 | 1578.875 |
| 0.439 | 0.220 | 1750.139 | 1525.295 | 1757.140 | 1574.498 |

When the wavelength band between $\lambda_{long}$ (OFF) and $\lambda_{short}$ (OFF) shown in Table 5 shifts from the wavelength band between $\lambda_{long}$ (ON) and $\lambda_{short}$ (ON) shown in Table 5, by using light having a wavelength corresponding to the shifted wavelength band, transmission and interruption of light can be switched in the photonic crystal device having holes, in a substrate, filled with a liquid crystal on the basis of the presence or absence of an electric field in the liquid crystal.

For example, in the case of light having a wavelength of 1550 nm, this wavelength is present between $\lambda_{long}$ (OFF) and $\lambda_{short}$ (OFF) when a is 0.428 μm and 0.439 μl. Thus, a photonic bandgap acts on light having a wavelength between $\lambda_{long}$ (OFF) and $\lambda_{short}$ (OFF). Consequently, the light of 1550 nm cannot be present in the photonic crystal and thus cannot be transmitted. In contrast, the wavelength of 1550 nm is present outside the wavelength band between $\lambda_{long}$ (ON) and $\lambda_{short}$ (ON). Therefore, when an electric field is applied to the liquid crystal, the light of 1550 nm can be transmitted. Thus, the object of the present invention is achieved.

What is claimed is:

1. An optical waveguide device comprising:

a pair of substrates opposing each other;

a sealant for joining the substrates at the edges of the substrates, at least part of the sealant being light-transmissive; and a liquid crystal sealed in the region surrounded by the substrates and the sealant;

division walls for partitioning the region between the substrates to define a plurality of conversion regions, at least part of each of the division walls being light-transmissive, electrodes provided at positions on the substrates corresponding to the conversion regions, and a plurality of cylindrical rods arranged in each conversion region at a period corresponding to an optical wavelength, wherein the dielectric constant of the liquid crystal in each conversion region is arbitrarily varied by applying an electric field to the corresponding conversion region.

2. An optical waveguide device according to claim 1, wherein at least part of the sealant has a light inlet and a light outlet.

3. An optical waveguide device according to claim 1, wherein the division walls comprise a light-transmissive material, and the electrodes corresponding to desired conversion regions selected from the conversion regions apply an electric field to the desired conversion regions, thereby guiding light through the desired conversion regions.

* * * * *